United States Patent [19]

Beyer

[11] Patent Number: 5,176,410
[45] Date of Patent: Jan. 5, 1993

[54] BRAZING AND SOLDERING FITTINGS FOR TUBES

[76] Inventor: Hans-Hermann Beyer, Am Birkenanger 11, W-8756 Kahl/Main, Fed. Rep. of Germany

[21] Appl. No.: 702,789

[22] Filed: May 21, 1991

[30] Foreign Application Priority Data

May 23, 1990 [DE] Fed. Rep. of Germany ....... 4016562

[51] Int. Cl.⁵ .............................................. F16L 13/00
[52] U.S. Cl. ................................... 285/187; 285/287; 285/291; 285/21; 228/56.3
[58] Field of Search ................ 285/187, 287, 291, 21; 228/56.3

[56] References Cited

U.S. PATENT DOCUMENTS

| | | | |
|---|---|---|---|
| 2,183,271 | 12/1939 | Wendel | 285/287 |
| 3,567,257 | 10/1968 | Nowosadko | 285/287 |
| 3,633,266 | 1/1972 | Taylor | 285/287 |

FOREIGN PATENT DOCUMENTS

| | | | |
|---|---|---|---|
| 206777 | 7/1955 | Australia | 285/287 |
| 2439717 | 3/1976 | Fed. Rep. of Germany | 285/287 |
| 2238107 | 7/1973 | France | 285/287 |
| 442431 | 2/1936 | United Kingdom | 285/287 |

*Primary Examiner*—Randolph A. Reese
*Assistant Examiner*—Timothy Aberle
*Attorney, Agent, or Firm*—Beveridge, DeGrandi & Weilacher

[57] ABSTRACT

Fittings made of copper, brass, red brass or steel are provided with an inside coating of a flux and a solder layer. By this technique, the soldering process is simplified, damages caused by overheating of the flux are avoided and the amount of the solder used is reduced.

21 Claims, 1 Drawing Sheet

BRAZING AND SOLDERING FITTINGS FOR TUBES

BACKGROUND OF THE INVENTION

The invention relates to fittings used for brazing and soldering of tubes.

Various techniques for brazing and soldering tubes are conventional and known. In one such technique, the tubes are first cut square and the burr is removed. Pipe ends are mechanically cleaned until the oxides are removed, and then a flux paste is applied with a small brush or a clean cloth. The parts are pushed into the fitting and the surplus paste should be wiped off. The joint is then heated. As soon as the soldering temperature is reached, additional solder is added by hand until the capillary space is filled.

Usually, the plumber cuts the tubes, assembles the pipe with the fittings and attaches the system to a wall until the entire network of pipes is complete. Before soldering, the pipes must be removed and put into pieces in order to enable the addition of the flux.

The fluxes are corrosive, therefore, they should not come into direct contact with the human body.

To prevent the fluxes from fast settling and to adjust the viscosity of the fluxes, organic substances are added. However, the use of these organic additives during the soldering process has many disadvantages. The additives burn, have a disagreeable odor, produce carbon black, and cause pores in the soldering seam. These disadvantages are especially evident when the solders ar overheated. It is very difficult for even an experienced plumber to determine when the proper soldering temperature is reached.

An improvement can be realized if a solder powder is added to the flux. By watching the flux carefully during the heating process, the user can realize when the solder powder melts. That gives him an indication that the optimal soldering temperature is close. The amount of solder powder present in such pastes is too small to completely fill the capillary space; therefore, it is necessary for the user to feed additional solder by hand. Penetration of the solder around the joint must be visually observed, and a fillet should form between the pipe and the fitting.

Flux residues are corrosive. They must be completely removed by rinsing the tubes with water. Fluxes with organic additives have created a great corrosion problem. Organic components which were not completely soluble in water, incorporated halogen containing flux residues. These covered flux residues have caused severe pitting corrosion in the copper tubes.

When adding solder by hand, it is not possible to exactly measure the amount added. Normally, the operator uses much surplus solder, which ca then penetrate into the tube and block it.

If the tubes are laid into a wall, it is not possible to add the solder from the back. It is this situation which is often the reason for an incomplete filling of the capillary space. This results in leaky fittings.

SUMMARY OF THE INVENTION

It is one objective of this invention to develop fittings for brazing and soldering metal tubes which require less handling by the user.

It is another objective of this invention to provide fittings wherein the optimal amount of flux and solder or braze are included.

It is another object of the invention to provide a process suitable for mass production of the fittings for brazing and soldering tubes.

The invention includes providing a coating of a thin flux layer on the inside walls of a fitting. Inside the flux layer, a thin braze or solder layer (braze or solder cylinder) is provided, which is preferably connected with a braze or solder deposit (braze or solder ring). It is preferred that the braze or solder cylinder and the braze or solder ring are formed into a single, unitary construction, i.e. a single piece.

Production of the fittings in accordance with this invention can be accomplished in the following manner. A ring of solder is formed into a thin walled cylinder. The outer diameter of this cylinder is somewhat small than the inner diameter of the fitting. The cylinder is coated on its outside with a flux. The flux-coated solder cylinder is then placed into the fitting and pressed against the fitting wall.

BRIEF DESCRIPTION OF THE DRAWINGS

These and other advantageous aspects of this invention will be more fully appreciated from the following detailed description, and further in view of the appended drawings, wherein.

DETAILED DESCRIPTION OF THE INVENTION

The process in accordance with this invention will be described in detail below, in conjunction with the Figures.

Starting with a solder ring, the final preform can be produced in a one step process by a conventional compressive forming process. The shape of the final solder preform can be described as a ring of solder with an attached thin cylinder of solder which is 1-2 cm high and 20-50 micrometer thick. A thin flux coating is applied to the solder preform. This flux coating may be applied to the solder cylinder by standard coating techniques known to those skilled in the art. The flux is preferably mixed with a solvent, such as methanol or ethylene glycol, and then coated onto the outer surface on the cylinder. The flux coated solder preform is dried until the solvent from the flux is completely evaporated, or it may even be heated to the melting point of the flux. The flux coated preform is then placed inside the fitting and pressed against the wall of the fitting with a special precision tool. Optionally, prior to pressing the flux coated cylinder against the fitting body with the precision tool, an additional deposit of solder or braze may be coated over the flux layer. Such precision tools are commercially available under the brand name Rotherberger. The tool is conventionally used by plumbers to expand the ends of copper tubing to a larger diameter. The tool comes with a set of changeable heads to facilitate different diameter tubes.

FIGS. 1-4 show longitudinal sections of a flux coated solder preform and an example of the assembly before and after the soldering process.

Figure 1:
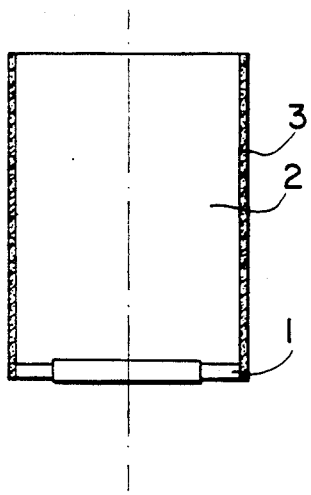
FIG. 1 shows the solder cylinder and thin flux layer used in accordance with the invention.
Figure 2:
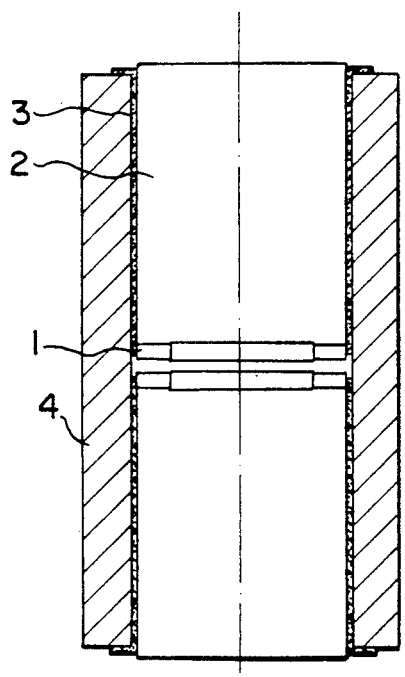
FIG. 2 shows the solder cylinder inserted into a fitting.

As shown in FIG. 1, the ring of solder (1) is preferably connected to a thin cylinder of the same solder (2). This cylinder of solder (2) is coated with a thin layer of flux (3). Two of these flux coated preforms are put into a fitting (4) with the solder ring (1) end placed into the fitting (4). This is shown in FIG. 2. A precision compression tool, as described above, is used to press the preform against the wall of the fitting (4).

Figure 3:
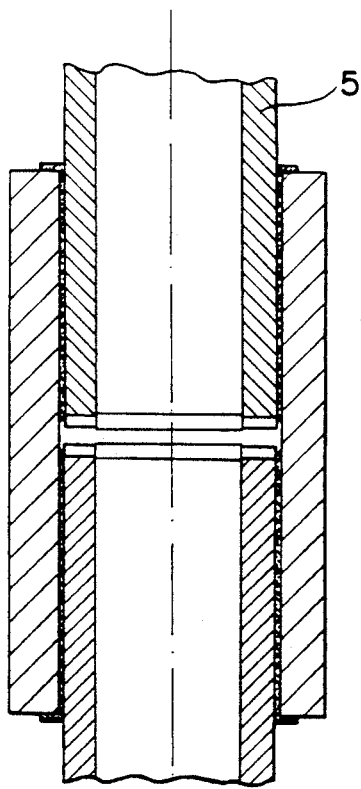
FIG. 3 shows two pipes connected within a fitting prior to heating the joint.

FIG. 3 shows two tubes o pipes (5) pushed into the fitting (4). In the preferred embodiments of this invention, the fittings are made from copper, brass, red brass or steel. It is possible to push the tubes (5) into the fitting (4) because the ductile solder preform is pressed onto the fitting wall with the precision tool.

Figure 4:
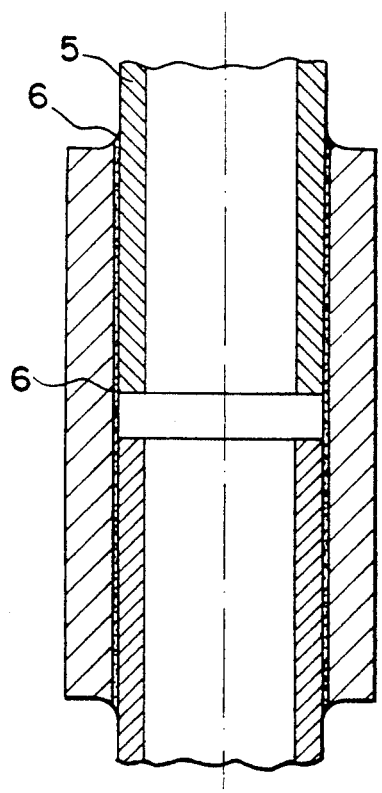
FIG. 4 shows the joint after the soldering process is complete.

In FIG. 4 the soldered joint is shown. During heating, the solder becomes molten and due to capillary action, it is sucked into the capillary space, thereby forming a fillet (6) between the pipe or tube (5) and fitting (4).

All dimensions and shapes mentioned in this specification are included for purposes of illustrating the invention, and should not be construed as limiting the invention. Various modifications in size and shape may be made without departing from the invention. The following is a list of dimensions corresponding to a preferred embodiment of the invention for purposes of illustration:

| | |
|---|---|
| a) inside diameter of the solder cylinder 2 | 14.6 mm; |
| b) thickness of the walls of the solder cylinder 2 | 0.03-0.04 mm; |
| c) height of the solder cylinder 2 | 12.5 mm; |
| d) inside diameter of the fitting 4 | 15 mm; |
| e) thickness of the walls of fitting 4 | 1 mm; |
| f) overall length of the fitting 4 | 24 mm; |
| g) inside diameter of solder ring 1 | 9.5 mm; |
| h) outside of diameter of solder ring 1 | 14.63 mm; |
| i) overall thickness of the solder ring 1 | 0.8 mm |
| j) thickness of the flux coating 3 | 0.01 mm; |
| k) distance between flux coating and fitting before compression | 0.2-0.3 mm; |
| l) outside diameter of pipe 5 to be inserted into the fitting | 15 mm. |

The fittings in accordance with this invention have many advantages, including the following advantages. No personal handling of the corrosive and environmentally harmful fluxes or pastes by the user is required. Pitting corrosion and hygiene problems can be avoided. Overheating or cold soldered joints are not a problem because the proper amount of flux and solder is optimally positioned at the joint.

This invention may be used with various solder compositions, flux compositions, and types of pipe and fitting materials. The following examples of various particular embodiments of these materials are given to illustrate the invention and should not be construed as limiting the same.

For copper piping in cold and warm water plumbing, a preferred solder contains 97 wt% Sn and 3 wt% Cu, or 96 wt% Sn and 4 wt% Ag. As a flux, a mixture of 85 wt% $ZnCl_2$ and 15 wt% $NH_4Cl$, or 82 wt% $SnCl_2$ and 18 wt% $NH_4Cl_2$ can be used. $ZnCl_2$ is hygroscopic, therefore, if the fittings are to be stored for a long period of time, it is better to use the $SnCl_2$ containing flux.

For cooper and steel tubes, a preferred braze contains 45 wt% Ag, 27 wt% Cu, 3 wt% Sn and 25 wt% Zn, and the fluxes which could advantageously be used are specified in the German standard DIN 8511 in class F-SH1.

The optimal amount of solder or flux depends on the size of the fittings. It is believed that the determination of these optimal amounts is a matter of routine experimentation, well within the level of ordinary skill in the art.

What is claimed is:

1. A fitting for brazing or soldering metal tubes, comprising:
    a cylindrical outer fitting body having an inside cylindrical wall;
    a braze or solder cylinder at least partially within said cylindrical outer fitting body, said braze or solder cylinder attached to said inside cylindrical wall of said outer fitting body;
    a thin braze or solder ring attached to an end of said braze or solder cylinder, said braze or solder ring being located within said fitting body; and
    a thin layer of flux located between said fitting body and said braze or solder cylinder, whereby a metal tube whose end is to be soldered or brazed is fitted into said cylindrical outer fitting body having said braze or solder cylinder attached thereto, and the brazing or soldering is performed by heating the fitting body with the metal tube therein, such that the fitting body acts as a coupling.

2. The fitting as claimed in claim 1, wherein the fitting body is made from at least one material chosen from the group of copper, brass, red brass or steel.

3. The fitting as claimed in claim 1, wherein the braze or solder cylinder and the braze or solder ring are made from the same material.

4. The fitting as claimed in claim 1, wherein said fitting body includes two braze or solder cylinders and two braze or solder rings.

5. The fitting as claimed in claim 1, wherein the braze or solder cylinder is a solder which includes about 97% tin and about 3% copper by weight.

6. The fitting as claimed in claim 1, wherein the braze or solder cylinder is a solder which includes about 96% tin and about 4% silver by weight.

7. The fitting as claimed in claim 1, wherein the flux layer includes about 85% zinc chloride and about 15% ammonium chloride by weight.

8. The fitting as claimed in claim 1, wherein the flux layer includes about 82% by weight tin chloride and about by weight ammonium chloride.

9. The fitting as claimed in claim 1, wherein the braze or solder cylinder is a braze which includes about 45% silver, about 27% copper, about 3% tin, and about 25% zinc, by weight.

10. A method for producing a fitting for brazing or soldering metal tubes, comprising:
    coating a thin walled solder or braze cylinder with a flux layer, and
    pressing said flux coated cylinder against an inner wall of a cylindrical fitting body to attach the flux coated solder or braze cylinder to the fitting body, whereby a metal tube whose end is to be soldered or brazed is fitted into said cylindrical outer fitting body having said braze or solder cylinder attached thereto, such that the fitting body acts as a coupling.

11. The method according to claim 10, wherein an end of the thin walled solder or braze cylinder includes a thin solder or braze ring attached to the end.

12. The method according to claim 11, wherein the end of the cylinder with the solder or braze ring attached thereto is located within the fitting body.

13. The method according to claim 10, wherein two solder or braze cylinders are pressed into said fitting body.

14. The method according to claim 11, wherein the braze or solder cylinder and the braze or solder ring are made from the same material.

15. The method according to claim 10, wherein prior to pressing the cylinder against the fitting body, an additional deposit of solder or braze is coated over the flux layer.

16. A fitting for brazing or soldering metal tubes, comprising:
    a cylindrical outer fitting body having an inside cylindrical wall;
    a braze or solder cylinder at least partially within said cylindrical outer fitting body, said braze or solder cylinder attached to said inside cylindrical wall of said outer fitting body; and
    a thin layer of a flux located between said fitting body and said braze or solder cylinder,
    wherein the fitting body is made from at least one material chosen from the group of copper, brass, red brass or steel, whereby a metal tube whose end is to be soldered or brazed is fitted into said cylindrical outer fitting body having said braze or solder cylinder attached thereto, and the brazing or soldering is performed by heating the fitting body with the metal tube therein, such that the fitting body acts as a coupling.

17. The fitting as claimed in claim 16, further comprising a thin braze or solder ring attached to an end of said braze or solder cylinder, said braze or solder ring being located within said fitting body.

18. The fitting as claimed in claim 17, wherein said braze or solder ring and said braze or solder cylinder are made of a single piece of braze or solder.

19. The fitting according to claim 16, wherein the braze or solder cylinder is chosen from the group of:
    (a) a solder which includes about 97% tin and about 3% copper by weight;
    (b) a solder which includes about 96% tin and about 4% silver by weight; or
    (c) a braze which includes about 45% silver, about copper, about 3% tin, and about 25% zinc, by weight.

20. The fitting according to claim 16, wherein the flux layer is chosen from the group of:
    (a) about 85% zinc chloride and about 15% ammonium chloride by weight; or
    (b) about 82% by weight tin chloride and about 18% by weight ammonium chloride.

21. A fitting for brazing or soldering together two metal parts, comprising:
    an outer fitting body;
    a first braze or solder cylinder and a second braze or solder cylinder, wherein each of said first and second braze or solder cylinders are at least partially within said outer fitting body;
    a first thin braze or solder ring attached to an end of said first braze or solder cylinder, a second thin braze or solder ring attached to an end of said second braze or solder cylinder, said first and second braze or solder rings being located within said fitting body; and
    a thin layer of a flux located between said fitting body and said first and second braze or solder cylinders, whereby a first metal part whose end is to be soldered or brazed is fitted into a first end of said cylindrical outer fitting body having said first braze or solder cylinder attached thereto, and a second metal part whose end is to be soldered or brazed is fitted into a second end of said cylindrical outer fitting body having said second braze or solder cylinder attached thereto, such that the fitting body acts as a coupling for the two metal parts.

* * * * *